(12) United States Patent
Beeman (10) Patent No.: US 8,209,041 B2
(45) Date of Patent: Jun. 26, 2012

(54) PROVIDING SECRET INFORMATION IN A MULTIPLAYER GAME

(75) Inventor: Ellen Beeman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1227 days.

(21) Appl. No.: 11/940,093

(22) Filed: Nov. 14, 2007

(65) Prior Publication Data

US 2009/0124380 A1   May 14, 2009

(51) Int. Cl.
*G06F 17/00* (2006.01)
(52) U.S. Cl. ......................................... 700/90
(58) Field of Classification Search ..................... 700/90; 463/39, 40, 16, 20, 25
See application file for complete search history.

(56) References Cited

U.S. PATENT DOCUMENTS

| | | | |
|---|---|---|---|
| 5,488,496 A | 1/1996 | Pine | |
| 5,528,319 A | 6/1996 | Austin | |
| 5,825,436 A | 10/1998 | Knight | |
| 6,177,887 B1 | 1/2001 | Jerome | |
| 6,262,843 B1 | 7/2001 | Marx | |
| 6,552,850 B1 | 4/2003 | Dudasik | |
| 6,597,328 B1 | 7/2003 | Stern et al. | |
| 7,247,356 B2 | 7/2007 | MacMaster | |
| 7,867,088 B2 * | 1/2011 | Prum .............................. | 463/37 |
| 2007/0026917 A1 | 2/2007 | Daviau | |
| 2008/0031592 A1* | 2/2008 | Harrington et al. ............. | 386/95 |
| 2009/0209326 A1* | 8/2009 | Okada ............................ | 463/25 |

FOREIGN PATENT DOCUMENTS

WO   2007106511   9/2007

OTHER PUBLICATIONS

Garth B. D. Shoemaker and Kori M. Inkpen, Single Display Privacyware: Augmenting Public Displays with Private Information, EDGE Lab, School of Computing Science, Simon Fraser University, Canada. http://www.edgelab.ca/publications/chi2001_sdp.pdf.
Privacy and Awareness in Multiplayer Electronic Games, Garth B.D. Shoemaker, EDGE Lab, School of Computing Science, Simon Fraser University, Canada. http://www.edgelab.ca/publications/wcgs2000_garth.pdf.
Anatomy of a Game Secret (Part Two): Animal Crossing, Gender and Fan Culture (Round Nineteen, Part Two): Lori Hitchcock Morimoto and David Surman, Printed Oct. 11, 2007. http://www.henryjenkins.org/games_culture/.

* cited by examiner

*Primary Examiner* — Ronald Laneau
(74) *Attorney, Agent, or Firm* — Vierra Magen Marcus & DeNiro LLP (57) ABSTRACT

A system and methods for conveying private information to a player in a multiplayer game being viewed by multiple players on a single screen. Each player is provided with a controller, which in one embodiment, includes a first input device and a second input device. The game system displays instructions on the screen prompting each player to select the first input device on the controller to ask a first question or select the second input device of the controller to ask a second question. Based on which input device each player selects, the game system displays an answer on the screen. The answers are viewable by all players. However, only each player knows what question they asked the game system to answer.

16 Claims, 6 Drawing Sheets

PROVIDING SECRET INFORMATION IN A MULTIPLAYER GAME

BACKGROUND

Video games have commonly been playable by more than a single player. Multiplayer video games are those that can be played either competitively or cooperatively by using multiple input devices (known as "controllers"). In local multiplayer games (multiple players playing on a single console), there is no visual mechanism for providing secret information to a single player without informing all players.

One attempt to provide secret information to one player without informing all players is a split-screen multiplayer mode. In this mode, the television (TV) screen or monitor is split into two, three, or four portions, each controlled by a different player simultaneously by their own controller. Split-screen gaming has several disadvantages. For example, the tactical play of the game can be ruined by a player looking at one of the screens controlled by the other players. By looking at the screen controller by another player, it is possible to view messages meant specifically for the other player and/or view where the other player is located in the game.

SUMMARY

One aspect of the present technology is to provide a game system that provides private information to each player in a multiplayer game viewed on a single screen. In one embodiment, the multiplayer game comprises a detective game where each player is either a detective or a criminal. In one embodiment of the detective game, each player selects one of the input devices on their controller to ask a "private" question. In response to each player's "private" question, the game system displays a "public" answer on the screen. Each player may view the "public" answer displayed for all players in the game. However, only each individual player knows the "private" question that they asked.

Another aspect of the present technology is to provide a game system that allows each player in a multiplayer game to receive private information even though the multiplayer game is being viewed on a single screen. In the game, each player controls their character by a controller. In one embodiment, each player may ask a question during different stages in the game. At each stage, the game system displays instructions on the screen to select a first input device on the controller to receive an answer associated with a first question or press a second input device on the controller to receive an answer associated with a second question. Based on which input device the player selects on their controller, the game system displays an answer on the screen.

DETAILED DESCRIPTION

The technology described herein provides secret information to each player of a multiplayer game being viewed on a single screen. At the beginning of the game, each player is presented with instructions to select a first input device to ask a first question and select a second input device to ask a second question. Based on the input device selected by each player, a "public" answer is displayed to each player on the screen.

Figure 1:
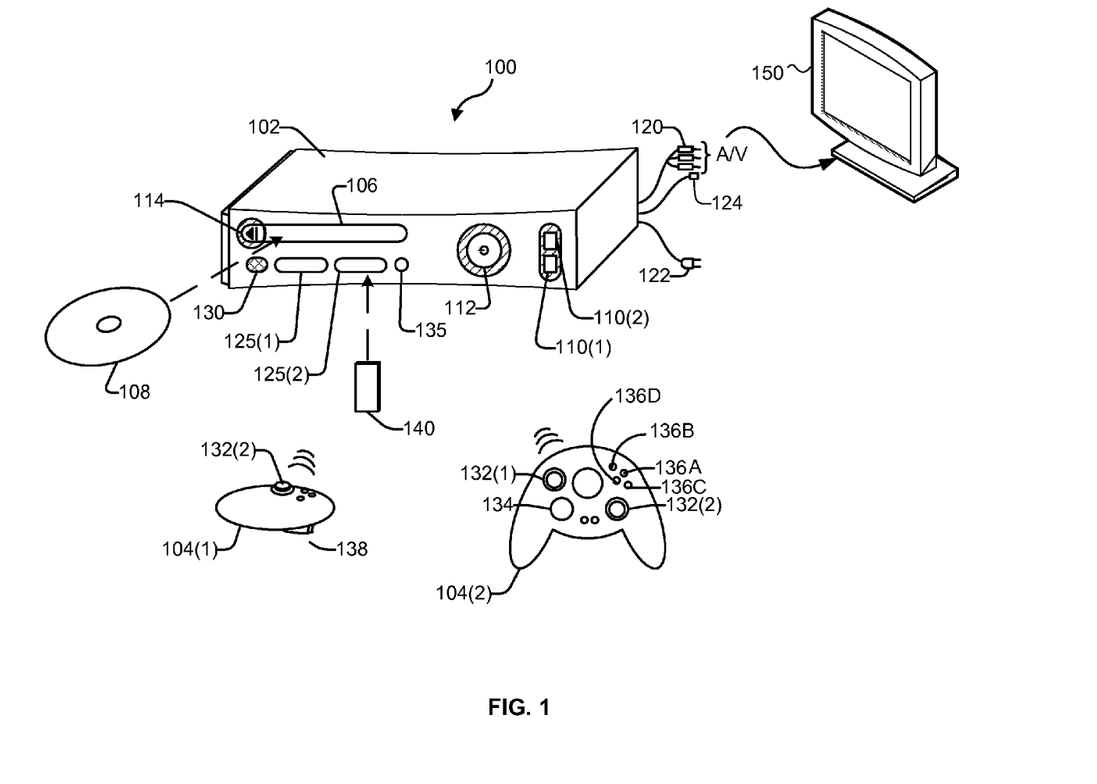
FIG. 1 is a schematic of an exemplary gaming system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wired or wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. Console 102 may be equipped with any of a wide variety of user interaction mechanisms. In an example illustrated in FIG. 1, each controller 104 is equipped with two thumbsticks 132(1) and 132(2), a D-pad 134, buttons 136A-136D, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. Samples of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select a game using controller 104 and display achievement information as discussed below.

Figure 2:
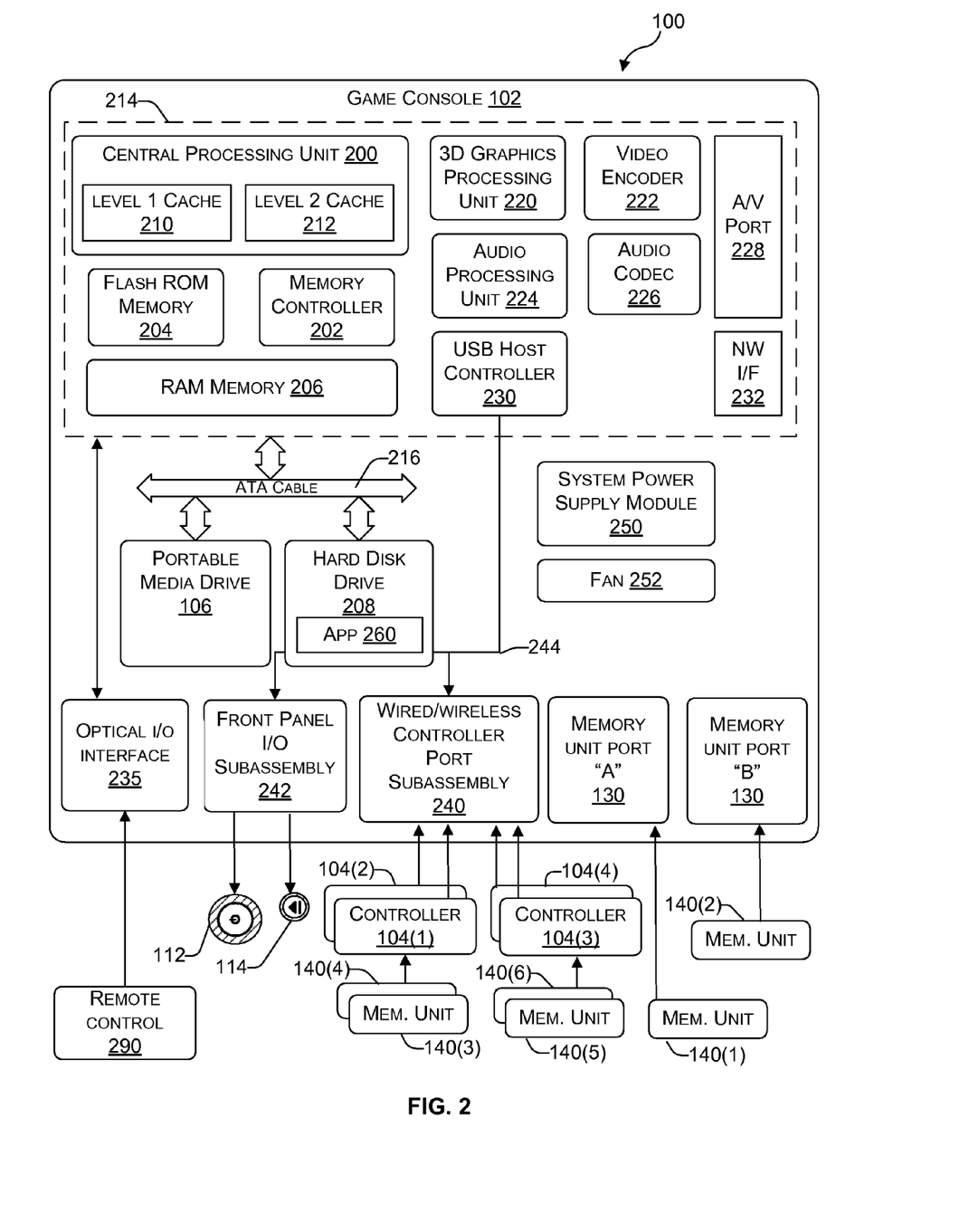
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
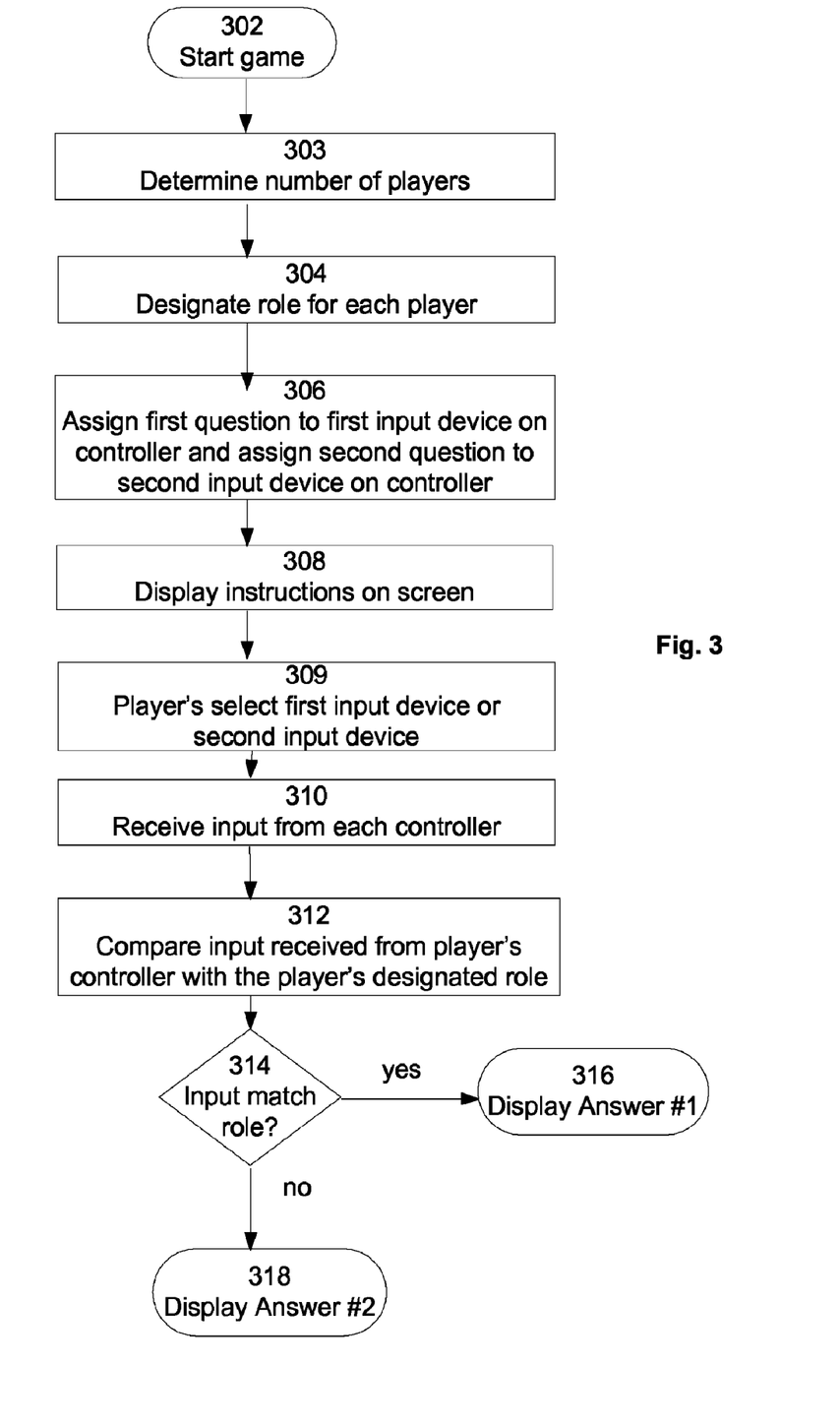
FIG. 3 is a flow diagram illustrating exemplary steps for providing private information to each player of a multiplayer game.

FIG. 3 illustrates a flow diagram providing exemplary steps for providing private information to each player of the multiplayer game. For purposes of describing the technology herein only, suppose the multiplayer game chosen by the players is a detective game whereby the object of the game is to catch the criminal. Each player is assigned a role at the beginning of the game. Each player is either a criminal or a detective. Each player, at the beginning of the game, may find out what role they have been assigned. The technology described herein is not limited to the detective game. The technology described herein may apply to any multiplayer game that is viewed on a single screen or any multiplayer game where more than one player plays the game on a single screen. In addition, the secret information provided to each player is not limited to providing information at the beginning the game. Secret information may be provided throughout the game.

In step 302, the detective game begins. In step 303, the console 102 determines the number of players that will play the game. In one embodiment, the console 102 detects the number of controllers 104 that have connected to the console 102. For purposes of describing this technology, four players will be playing the Detective game: Player A, Player B, Player C and Player D. Thus, the console 102 determines that four players are going to play the detective game. In an alternative embodiment, one of the players selects the number of players on the screen.

In step 304, the console 102 designates a character role for each player. For purposes of describing the technology herein, suppose the console 102 designates Player A as a criminal, Player B as a detective, Player C as a detective and Player D as a detective. Each player will want to know their character role at the start of the game because it will affect how they operate within the game. For example, Player A, knowing he is the criminal, will try to avoid the other players.

The system provides instructions to the players how to determine what role they have been assigned. Before displaying instructions, however, the system must determine how the players will ask a question with their controller. In the detective game embodiment, each player may be one of two roles: either a detective or criminal. In step 306, the console 102 maps a first question to a first input device of each controller 104. For example, the console 102 maps the question "Am I the criminal" to button 136A of each players controller 104. The console 102 also maps a second question to a second input device of each controller 104. For example, the console 102 maps the question "Am I a Detective" to the button 136B of each of the player's controllers 104. Both of these questions may be answered by a "YES" or "NO."

Figure 4:
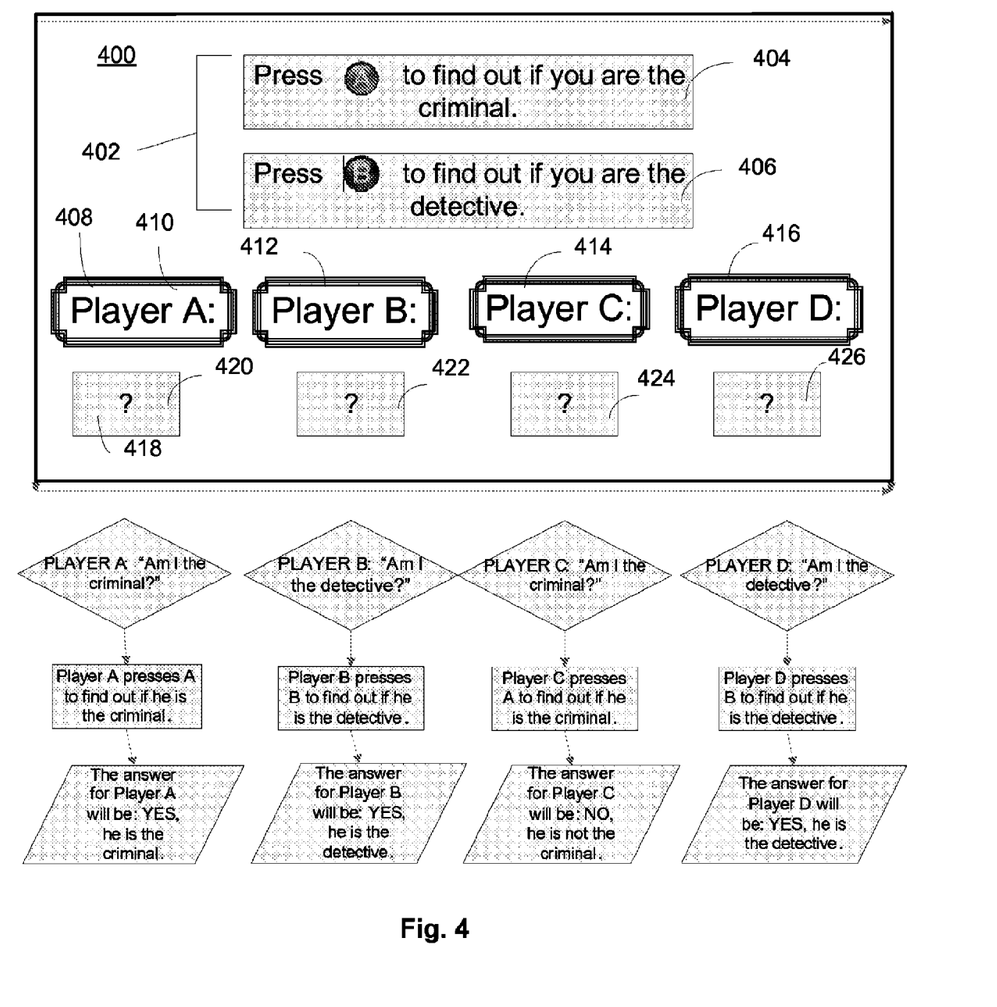
FIG. 4 depicts an exemplary graphical user interface for displaying public answers to each player in a multiplayer game.

In step 308, the console 102 displays instructions on the screen 150. FIG. 4 illustrates exemplary instructions displayed on the screen 150 for the Detective game. In the FIG. 4 embodiment, the console 102 displays instructions 402 on the graphical user interface (GUI) 400. Here, the instructions 402 include two sets of instructions. Instructions 404 prompt each player to "Press A to find out if you are the criminal." Instructions 406 prompt each player to "Press B to find out if you are the detective." Each set of instructions allow a player to ask a yes/no answerable question about the role of their character. More details describing FIG. 4 will be provided later.

In step 309, each player presses either button A 136A or button B 136B on their controller 104. By pressing button 136A of the controller 104, the player inquires whether they are the criminal. By pressing button B 136B of the controller 104, the player inquires whether they are a detective. Suppose that Player A presses button A 136A of his controller 104 to find out if he the criminal, Player B presses button B 136B of her controller 104 to find our if she is a detective, Player C presses button A 136A of her controller 104 to find out if she is the criminal and Player D presses button B 136B of his controller 104 to find out if he is a detective.

In step 310, the console 102 receives the input from each player's controller 104 based on whether the player pressed button A 136A or button B 136B on the controller 104. In the above example, console 102 receives input that Player A selected button A 136A (asking "Am I the criminal"), Player B selected button B 136B (asking "Am I a Detective"), Player C selected button A 136A (asking "Am I the criminal") and Player D selected button B 136B (asking "Am I a Detective").

In step 312, the console 102, for each player, compares the input received from the player (step 310) to the role assigned to the player (step 304). For Player A, the console 102 compares the input received by Player A (selected button A 136A of the controller 104) to the designated role of Player A (criminal). For Player B, the console 102 compares the input received by Player B (selected button B 136B of the controller 104) to the designated role of Player B (detective). For Player C, the console 102 compares the input received by Player C (selected button A 136A of the controller 104) to the designated role of Player C (detective). For Player D, the console 102 compares the input received by Player D (selected button B 136B of the controller 104) to the designated role of Player D (detective).

In step 314, the console 102 determines whether the input received by each player matches the player's designated role. In one embodiment, the console 102 interprets input that button A 136A has been selected as "criminal" and input that button B 136B has been selected as "detective." Thus, the console 102 determines the following:

Player A: input matches the role.
Player B: input matches the role.
Player C: input does not match the role.
Player D: input matches the role.

Based on whether the console 102 determines if the input matches the role, the console 102 will display either Answer #1 (Step 316) or Answer #2 (step 318). The console 102 displays either Answer #1 or Answer #2 in an answer window 418 in the GUI 400. In the Detective game, the questions asked by each player—"Am I the criminal" or "Am I a Detective"—may be answered by a "YES" or "NO" answer. Thus, in this embodiment, Answer #1 comprises "YES" and Answer #2 comprises "NO." In an alternative embodiment, the console 102 may display other answers such as displaying a color in each answer window 418 (e.g., the color green indicates "YES" and the color red indicates "NO"), a shape in each answer window 418 (e.g., a happy face displayed in the window indicates "YES" and a sad face in the window indicates "NO"), and so on. In step 316, the console 102 displays "YES" if the input matches the role. Alternatively, in step 318, the console 102 displays "NO" of the input does not match the role.

FIG. 4 illustrates an exemplary GUI 400 that may be displayed on the screen 150 at the beginning of the game. The GUI 400 includes instructions 402, player identifiers 408 and answer windows 418. Instructions 402 includes a first instruction 404 and a second instruction 406. The first instruction 404 prompts each player to "Press A to find out if you are the criminal." Second instruction 406 prompts each player to "Press B to find out if you are the detective."

The GUI 400 also includes a player identifier 408 for each of the player's playing the game. Because Players A, B, C and D are playing the Detective game, GUI 400 includes a player identifier 410 for Player A, a player identifier 412 for Player B, a player identifier 414 for Player C and a player identifier 416 for Player D. The specific player identifiers 408 shown in FIG. 4 are for illustrative purposes only. Other player identifiers 408 may include a logo, an avatar, clipart, animation, and so on. The player identifiers 408 are also shown in a horizontal configuration. However, the player identifiers 408 may be displayed or configured in any number of ways.

The GUI 400 displays an answer window 418 associated with each player identifier 408. Answer display window 420 is associated with player identifier 410. Answer display window 422 is associated with player identifier 412. Answer window 422 is associated with player identifier 414. Answer window display window 424 is associated with player identifier 416. Each answer window 418 is located below a player identifier 408 so that each player understands which answer to view.

Figure 7:
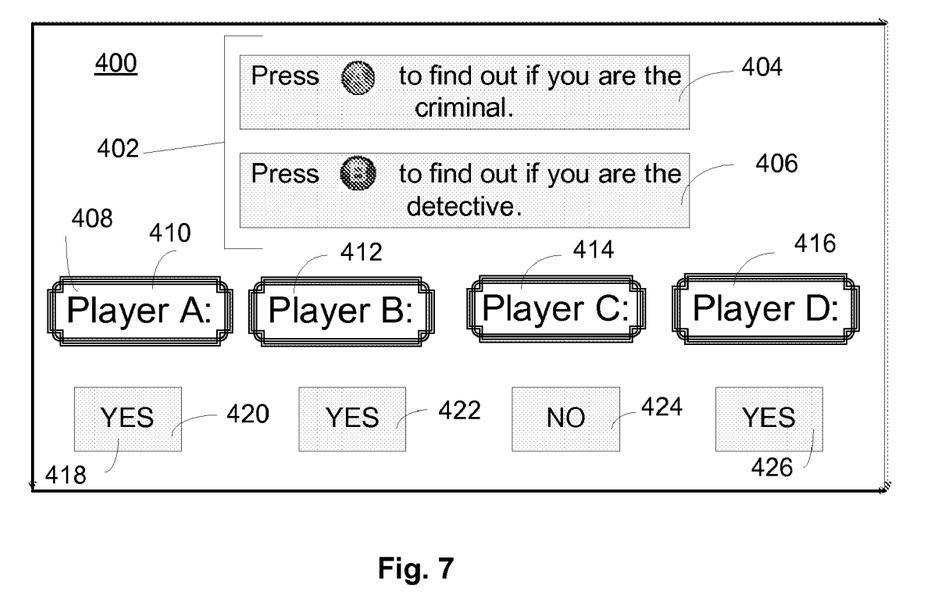
FIG. 7 depicts the graphical user interface shown in FIG. 4 displaying public answers to each player in a multiplayer game.

The result of method 300 is that the GUI 400 displays "YES" in the answer window 420 for Player A, displays "YES" in the answer window 422 for Player B, displays "NO" in the answer window 424 for Player C and displays "YES" in the answer window 426 for Player D (see FIG. 7). Thus, Player A knows that "YES," he is the criminal. Player B knows that "YES," she is a detective. Player C knows "NO," she is not the criminal. And Player D knows that "YES," he is a detective. Because each player may be one of only two roles in the detective game, Player C, even though she received a negative answer, understands that she is a detective. Thus, every player knows their role at the beginning of the game.

Even though each player can view the answers for the other players in the GUI 400, none of the players know what question was asked by each other. For example, even though the GUI 400 displays "YES" in window 420 for Player A, Players B, C and D do not know whether Player A pressed button A 136A of his controller 104 to ask the question "Am I the criminal" or whether Player A pressed button B 136B of his controller 104 to ask "Am I a detective." Similarly, Players A, C and D can view the answer "YES" displayed in window 422 associated with player B. However, Players A, C and D do not know whether Player B pressed button 136A of her controller 104 to ask the question "Am I the criminal" or whether Player B pressed button 136B of her controller 104 to ask "Am I a detective." Players A, B and D can view the answer "NO" displayed in the window 424 associated with Player C in the GUI 400. However, Players A, B and D do not know whether Player C pressed the button 136A of her controller 104 to ask "Am I the criminal" or whether Player C pressed button 136B of her controller to ask "Am I a detective." Players A, B and C can view the answer "YES" in window 426 associated with Player D in GUI 400. However, Players A, B and C do not know whether Player D pressed button 136A of his controller to ask "Am I the criminal" or whether Player D pressed button 136B of his controller to ask "Am I a detective."

Players A, B, C and D are now individually and secretly informed of their role in the game, and can proceed with playing the game. The information conveyed to each player is private because the players cannot determine each others role simply by viewing the answers. Each answer can have two different meanings depending on which button the player selected on the controller. For example, in FIG. 4, answer windows 418, 422 and 426 each display "YES." However, without knowing which button a particular player selected, each player does not know the roles of the other players. In this example, the "YES" displayed in window 418 tells Player A the he is the criminal, the "YES" displayed in window 422 tells Player B the she is a detective and the "YES" displayed in the window 426 tells Player D the he is a detective. Player A does not, however, know whether window 422 indicates that "YES," Player B is the criminal or "YES," Player B is a detective.

Figure 5:
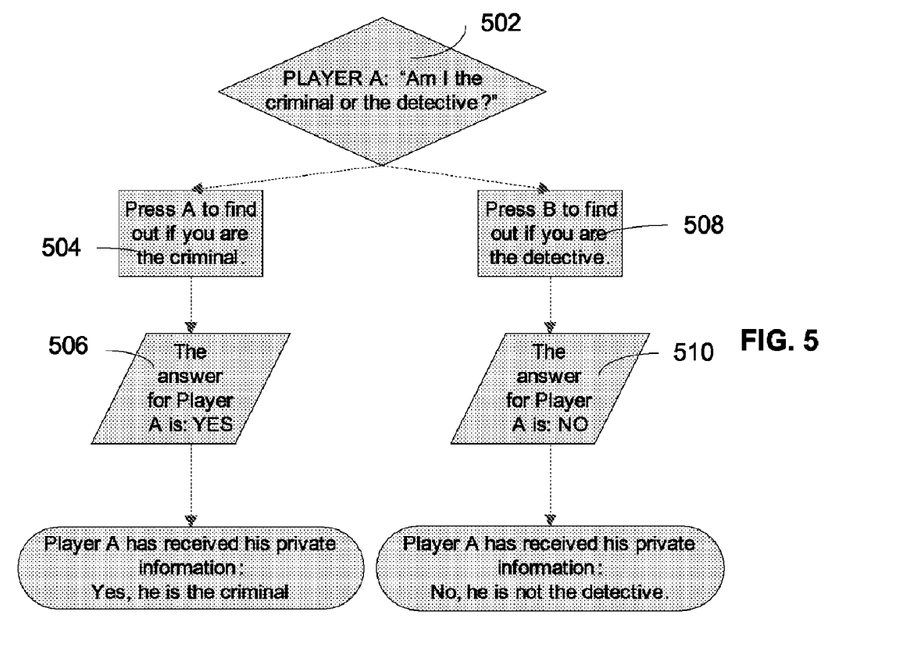
FIG. 5 depicts a flow diagram illustrating exemplary steps a player of the multiplayer game experiences to receive private information.

FIG. 5 illustrates a flow diagram providing exemplary steps demonstrating why the information provided to a player is secret even though the answer is publicly displayed on the screen 150. Suppose, in this example, that the console 102, in step 304, has designated Player A as the criminal. After the console 102 displays the instructions on the screen (step 308), Player A views the instructions 402 in the GUI 400 and must decide whether to press button 136A of his controller 104 receive an answer to the question "Am I the criminal" or press button 136B of his controller to receive an answer to the question "Am I the detective." Suppose that Player A, in step 502, decides to select button 136A. Then, in step 504, Player A selects button 136A of his controller 104 to find out whether he is the criminal. Unless another player watched which button Player A selected, Player A's question comprises a "private" question. In step 506, the console 102 displays "YES" in the answer window 420. Thus, Player A has received his private information that YES, he is the criminal in the Detective game.

Alternatively, Player A, in step 502, may decide to ask "Am I a detective." In step 508, Player A selects button 136B on his controller 104. In step 510, the console 102 displays "NO" in the answer window 420. Thus, Player A has received private information that "NO," he is not the detective. Player A will find out that he is the criminal in the Detective game regardless of whether Player A presses button 136A of the controller 104 or button 136B of the controller 104. And Player A receives the private information without alerting Player B, Player C or Player D to his role.

Figure 6:
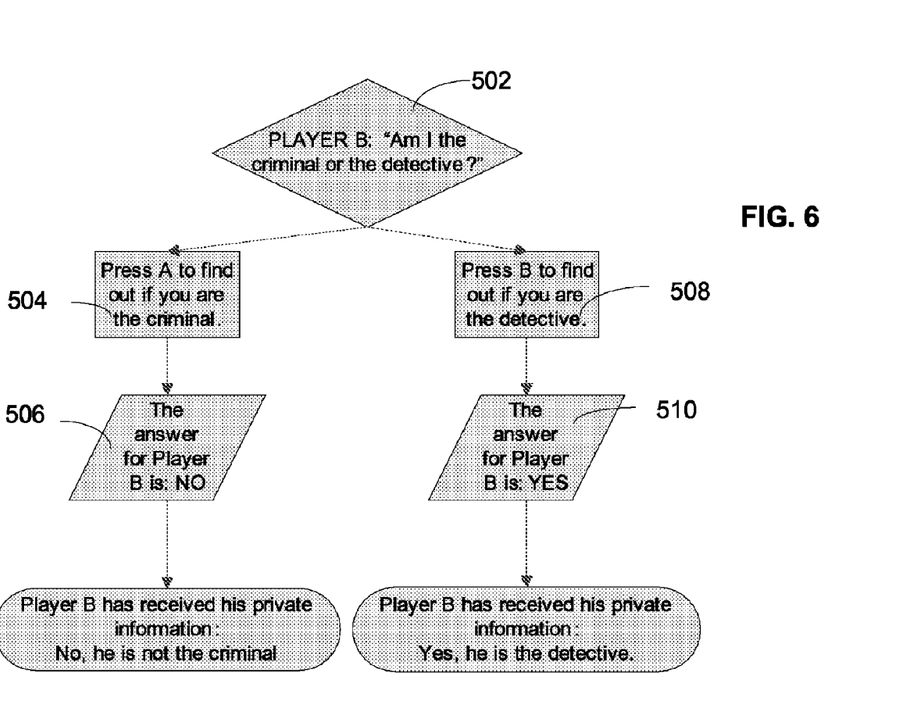
FIG. 6 depicts a flow diagram illustrating another embodiment of exemplary steps a player of the multiplayer game experiences to receive private information.

FIG. 6 illustrates another flow diagram providing exemplary steps demonstrating why the information provided to a player is secret even though the answer is publicly displayed on the screen 150. Suppose the console 102, in step 304, has designated that Player B is a detective in the Detective game. FIG. 6 illustrates that Player B may discover whether he is a detective or a criminal regardless of whether Player B presses button 136A or button 136B on her controller 104. Suppose, in step 502, Player B views the instructions 402 displayed in the screen 150 and decides to select button 136A of her controller 104 to ask "Am I a criminal." In step 504, Player B selects button 136A of her controller 104. In step 506, the console 102 displays "NO" in the answer window 422. Thus, Player B receives her private information that "NO," she is not the criminal in the Detective game.

Alternatively, Player B, in step 502, may decide to ask "Am I a detective." In step 508, Player B selects button 136B of her controller 104. In step 510, the console 102 displays "YES" in answer window 422. Thus, Player B has receives her private information that "YES," she is a detective in the mystery game. Player B finds out that she is a detective regardless of whether Player B presses button 136A of the controller 104 or button 136B of the controller 104. And Player B receives the private information without alerting Player A, Player C or Player D to her role.

The technology described herein is not limited to the Detective game example provided above. The technology described herein may also apply to a game that presents more than two questions to the players at the beginning of the game. In this example, each player would select button A 136A to ask a first question, button B 136B to ask a second question, button C 136C to ask a third question and button D 136D to ask a fourth question.

Or that the Detective game allows the players to ask questions about each other throughout the game. For example, at a certain stage of the game, the system displays instructions on the screen such as "Press A to find out if Player A is the criminal," "Press B to find out if Player B is the criminal," "Press C to find out if Player C is the criminal" and "Press D to find out if Player D is the criminal." Each player may press one of the four buttons on their controller to find out information about another player. In one embodiment, if the answers to the questions are "YES" and "NO," each player will know the answer to their question but no the answer to the other players' questions. For example, Player A presses button C 136C on his controller. If the answer displayed in window 418 says "NO," then Player A understands that Player C is not the criminal.

FIG. 7 illustrates one example of the GUI 400 displaying the answers in each answer window 418. In this embodiment, the public answer displayed in each answer window 418 is displayed beneath each player identifier 408. For example, display window 420 is located directly beneath the Player A identifier 410, answer window 422 is located beneath the Player B identifier 412, the answer window 424 is located beneath the Player C identifier 414 and display window 426 is located beneath Player D identifier 416. As discussed above, the answers "YES" and "NO" do not identify the role of each particular player because the answer displayed in a window 418 could be answering either question presented in the instructions 402.

Figure 8:
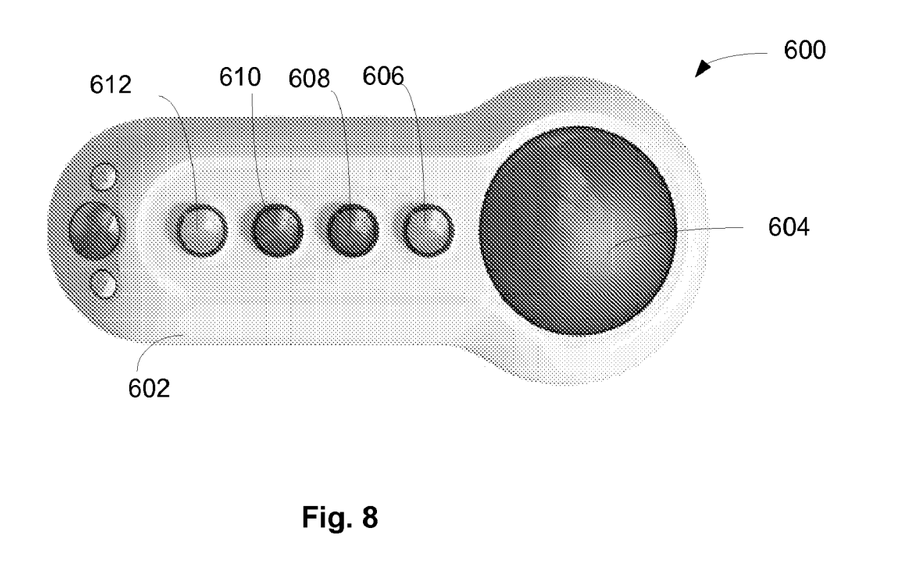
FIG. 8 depicts an alternative embodiment of a controller that may be used by each player in the multiplayer game.

Many conventional controllers include feedback mechanisms. For example, in the Detective game embodiment, the controller, if it included a vibrate feedback mechanism, may vibrate to indicate "yes" to a question and not vibrate to indicate a "no" to the question. FIG. 8 illustrates an exemplary controller 600 that does not contain any such feedback mechanisms. Thus, the game system provides visual answers displayed on the screen. In this embodiment, the controller 600 comprises a Microsoft Big Button control pad. The control pad 600 includes a body 602, a main button 604, and four auxiliary buttons: a first button 606, a second button 608, a third button 610 and a fourth button 612. In this embodiment, the first button 606 displays the letter "A" on the button, the second button 608 displays the letter "B" on the button, the third button 610 displays the letter "X" on the button and the fourth button 612 displays a "Y" on the button. Players A-D, using the control pad 600 to play the Detective game, may ask questions using the four buttons 606-612. For example, each player would select the first button 606 to ask the question "Am I the criminal" or select the second button 608 to ask "Am I the Detective."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method performed by one or more processors for conveying secret information to a player in a multiplayer game being viewed by multiple players on a single screen, wherein each player is provided with a controller having a first input device and a second input device, comprising:
   displaying instructions on the screen, wherein the instructions prompt each player to select the first input device on the controller to ask a first question and select the second input device of the controller to ask a second question;
   receiving input from each controller, wherein the input from each controller is based on whether the player selected the first input device or the second input device;
   displaying answers on the screen to the first question and the second question based on the input received from each controller;
   displaying a player identification on the screen for each player; and
   displaying the answers to the first question and the second question including displaying each answer to the first question and the second question proximate to each player identification displayed on the screen.

2. The method as recited in claim 1, wherein the first answer and the second answer comprise one of the following: "yes" and "no".

3. The method as recited in claim 1, further comprising:
   determining the number of players.

4. The method as recited in claim 3, wherein receiving input from each controller comprises:
   receiving input from each of the controllers for each of a plurality of players in the game.

5. The method as recited in claim 3, wherein displaying answers on the screen comprises:
   displaying an answer for each of a plurality of players in the game.

6. The method as recited in claim 1, wherein displaying the instructions on the screen occurs at the beginning of the multiplayer game.

7. A system for conveying private information to each player in a local multiplayer game, comprising:
   a plurality of controllers, wherein each of the controllers includes a first input device, a second device, a third device, and a fourth input device;
   a screen;
   a console for communicating with each of the plurality of controllers and the screen, wherein the console is configured to display instructions on the screen prompting the players to press the first input device of the controller to ask a first question, prompting the players to press the second input device of the controller to ask a second question, prompting the players to press the third input device of the controller to ask a third question, and prompting the players to press the fourth input device of the controller to ask a fourth question, wherein the console is further configured to receive transmission signals from each of the controllers and display answers on the screen based on whether a player selected the first input device, the second input device, the third input device, or the fourth input device.

8. The system as recited in claim 7, wherein the console comprises a personal computer.

9. The system as recited in claim 8, wherein:
the controller comprises a gamepad having a first button and a second button;
the first input device comprises the first button; and
the second input device comprises the second button.

10. The system as recited in claim 7, wherein the console is further configured to display a player identifier on the screen for each player.

11. The system as recited in claim 10, wherein the player identifier includes one of the following: the player's name, an avatar, clip art, a photograph, an animation and a video clip.

12. The system as recited in claim 7, wherein the console is configured to display the instructions on the screen at the beginning of the game.

13. A tangible computer-readable storage medium having computer-executable instructions for programming a processor of a gaming system to perform a method for providing private information to each player in a multiplayer game, wherein the game is viewed on a single screen and each player has a controller having a first input device and a second input device, comprising:
assigning a first question to the first input device of each controller and a second question to the second input device of each controller;
displaying instructions on the screen, wherein the instructions prompt each player to select the first input device on the controller to ask the first question and select the second input device of the controller to ask the second question;
receiving input from each controller, wherein the input from each controller is based on whether the player selected the first input device of the controller or the second input device of the controller; and
displaying the answers to the first question and the second question on the screen based on the input received from each controller, displaying the answers to the first question and the second question including displaying each answer to the first question and the second question proximate to each player identification displayed on the screen.

14. The tangible computer-readable storage medium as recited in claim 13, wherein the instructions displayed on the screen are displayed at the beginning of the game.

15. The tangible computer-readable storage medium as recited in claim 13, further comprising:
starting the game after a predetermined amount of time has passed after displaying the answers to the first question and the second question.

16. The tangible computer-readable storage medium as recited in claim 13, wherein displaying the answers to the first question and the second question comprising:
displaying the answers only after the input from each controller has been received by all of the controllers.

\* \* \* \* \*